(12) United States Patent
Shimoyama et al.

(10) Patent No.: US 7,459,801 B2
(45) Date of Patent: Dec. 2, 2008

(54) CONTROL APPARATUS FOR SELECTIVELY CONTROLLING OUTPUT CURRENT AND OUTPUT VOLTAGE OF ELECTRIC GENERATOR

(75) Inventors: Takeshi Shimoyama, Kariya (JP); Katsunori Tanaka, Ichinomiya (JP); Kazuyoshi Obayashi, Chita-gun (JP); Keisuke Tani, Nagoya (JP); Yukihiro Yamashita, Takahama (JP); Daisuke Kuroda, Kariya (JP)

(73) Assignee: Denso Corporation, Kariya (JP)

( * ) Notice: Subject to any disclaimer, the term of this patent is extended or adjusted under 35 U.S.C. 154(b) by 147 days.

(21) Appl. No.: 11/508,232

(22) Filed: Aug. 23, 2006

(65) Prior Publication Data

US 2007/0052243 A1    Mar. 8, 2007

(30) Foreign Application Priority Data

Sep. 7, 2005    (JP)    ............................. 2005-258693

(51) Int. Cl.
*F02N 11/06*    (2006.01)
*H02P 9/04*    (2006.01)

(52) U.S. Cl. .................................... 290/40 B
(58) Field of Classification Search ............... 290/40 R, 290/40 C, 40 B; 307/10.1; 322/24, 28
See application file for complete search history.

(56) References Cited

U.S. PATENT DOCUMENTS

| | | | | |
|---|---|---|---|---|
| 5,444,354 A * | 8/1995 | Takahashi et al. | ............. | 322/28 |
| 6,452,286 B1 * | 9/2002 | Kubo et al. | ................ | 290/40 C |
| 6,979,977 B2 * | 12/2005 | Amano et al. | ................ | 320/104 |
| 7,081,738 B2 * | 7/2006 | Muramatsu et al. | ........... | 322/24 |
| 7,106,029 B2 * | 9/2006 | Inokuchi et al. | ................ | 322/28 |
| 7,173,347 B2 * | 2/2007 | Tani et al. | ................... | 307/10.1 |
| 7,285,938 B2 * | 10/2007 | Aoyama | ...................... | 322/28 |
| 2004/0124703 A1 | 7/2004 | Tani et al. | | |
| 2004/0164616 A1 * | 8/2004 | Obayashi et al. | ............... | 307/18 |
| 2005/0104378 A1 * | 5/2005 | Matsuda | ................... | 290/40 C |
| 2005/0206350 A1 * | 9/2005 | Inokuchi et al. | ............... | 322/28 |
| 2007/0152641 A1 * | 7/2007 | Kusafuka et al. | ............... | 322/28 |

FOREIGN PATENT DOCUMENTS

| | | |
|---|---|---|
| JP | A 6-54464 | 2/1994 |
| JP | A 07-075262 | 3/1995 |
| JP | A 2001-352795 | 12/2001 |
| JP | A 2004-194495 | 7/2004 |
| JP | A 2004-260908 | 9/2004 |
| WO | WO 2005080774 A2 * | 9/2005 |

* cited by examiner

*Primary Examiner*—Julio Gonzalez
(74) *Attorney, Agent, or Firm*—Oliff & Berridge, PLC (57) ABSTRACT

An electric generator control apparatus of a vehicle sets respective target values of output voltage and output current for the electric generator of the vehicle, and selectively establishes a voltage control mode for holding the generator output voltage at the target voltage or a current control mode for holding the generator output current at the target current, with the mode selection and the setting of target values being performed based on criteria such as the level of charge of the vehicle battery, the electrical load of the vehicle equipment, etc.

5 Claims, 7 Drawing Sheets

CONTROL APPARATUS FOR SELECTIVELY CONTROLLING OUTPUT CURRENT AND OUTPUT VOLTAGE OF ELECTRIC GENERATOR

CROSS-REFERENCE TO RELATED APPLICATIONS

This application is based on and incorporates herein by reference Japanese Patent Application No. 2005-258693 filed on Sep. 7, 2005.

BACKGROUND OF THE INVENTION

1. Field of Application

The present invention relates to a control apparatus for an electric generator that is installed on a motor vehicle, for charging a battery of the vehicle and supplying power to electrical loads of the vehicle.

2. Description of Related Art

The electric generator of a motor vehicle (often referred to as the alternator of the vehicle) is a combination of an AC generator that is driven from the vehicle engine, and a rectifier apparatus, for producing a (unsmoothed) DC voltage which is supplied to charge the vehicle battery and to drive various electrical loads of the vehicle such as lamps, etc. Charging of the battery is performed such as to maintain the output voltage from the battery within a predetermined range. Methods are known for effecting this by controlling the level of output voltage from the electric generator (in general, by varying the level of field current of the generator) in accordance with the charge voltage of the battery (i.e., the output voltage that is produced by the battery when charging is halted, and whose value varies with the state of charge of the battery) or in accordance with the amount of power being consumed by the electrical loads of the vehicle, for example as described in Japanese patent first publication No. 6-54464 and Japanese patent first publication No. 2001-352795, referred to in the following as reference document 1 and reference document 2, respectively.

However with such a method of controlling the output voltage of the electric generator, the efficiency of operation of the electric generator may deteriorate as a result of variations in the running condition of the vehicle, the engine operating conditions, the state of charge of the battery and the degree of deterioration of the battery, etc. For example during engine idling, with the battery at a low level of charge, if the output voltage of the electric generator is increased in order to maintain the charge voltage of the battery at a predetermined value, then the operating efficiency of the electric generator will be lowered. Similarly, with such methods of controlling only the output voltage of the generator, it may not be possible to achieve a sufficiently high efficiency of recovering the dynamic energy of the vehicle motion during deceleration of the vehicle, by converting that energy to electrical power which is stored in the battery. Furthermore, since the electric generator is driven from the vehicle engine, a lowering of the operating efficiency of the generator will result in increased fuel consumption.

Figure 7:
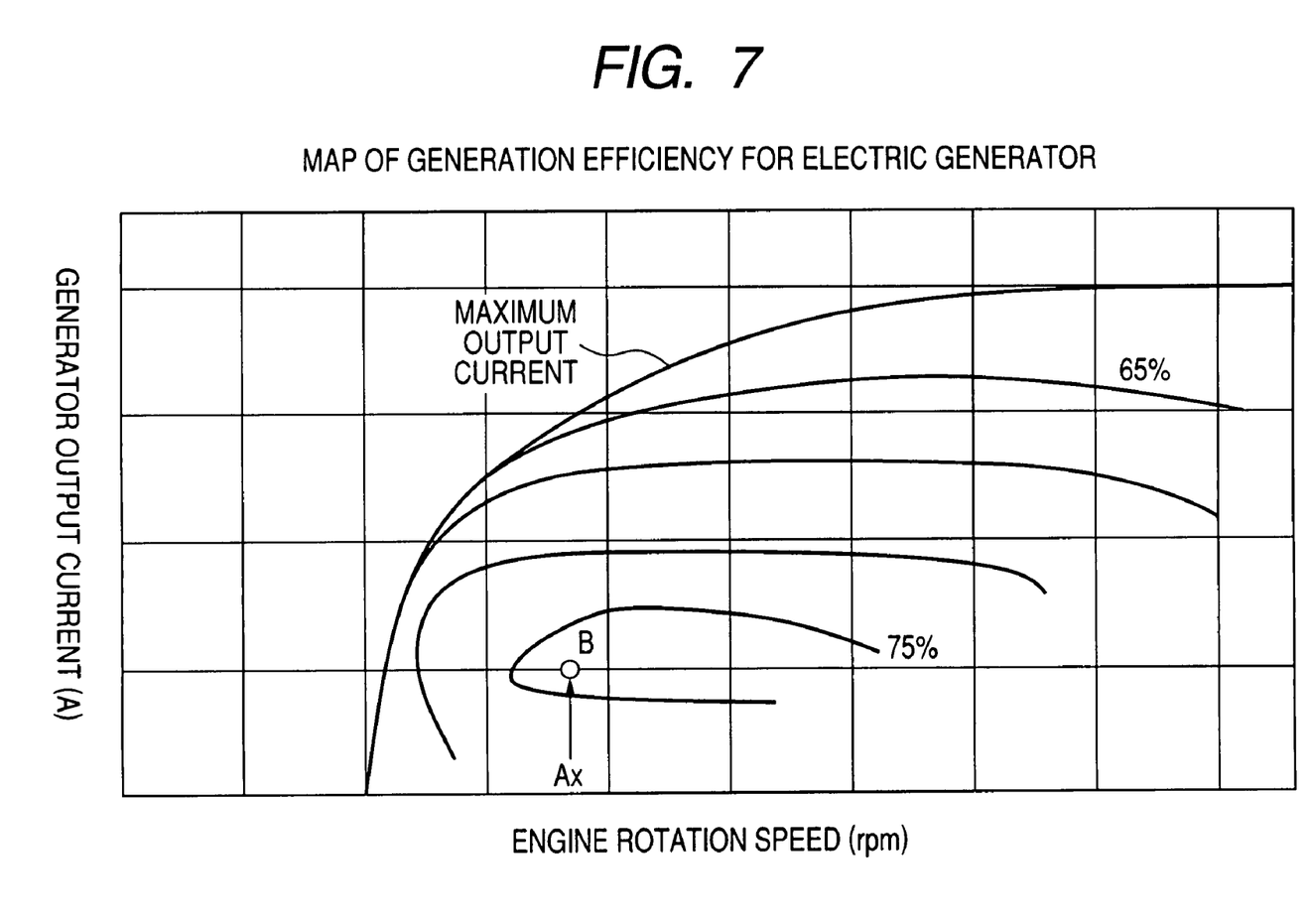
FIG. 7 is a map diagram showing efficiency characteristics of an engine-driven electric generator, with generated output power and engine speed of rotation as parameters.

FIG. 7 is a map diagram of an example of electric generator efficiency characteristics for an engine-driven generator, in which the output current of the generator and the engine rotation speed are parameters. For example in the case of generation corresponding to the point "A" in FIG. 7, for the same value of engine rotation speed, if the output current of the electric generator is increased for example to point "B", then the operating efficiency of the generator will be increased. Hence it can be understood that with methods of electric generator control which perform only control of the output voltage of the generator, it cannot be ensured that maximum operating efficiency for the generator can be achieved.

Furthermore with a conventional type of vehicle generator control system in which control is applied only to the generator output voltage, the system may attempt to maintain the output voltage of the generator at a high level while the engine is idling (i.e., with the vehicle halted). This will result in lowering the efficiency of operation of the electric generator, while in addition, due to fluctuations in the level of output current supplied from the generator, the amount of drive torque that must be applied to the generator by the engine will fluctuate accordingly. This causes irregularity of the engine idling speed (i.e., each increase in the level of drive torque results in a lowering of the engine speed of rotation), and such engine speed fluctuations during idling can impart an unpleasant sensation to the vehicle driver.

SUMMARY OF THE INVENTION

It is an objective of the present invention to overcome the above problem, by providing a control apparatus for an electric generator of a vehicle whereby high efficiency of generation can be achieved, so that fuel economy for the vehicle can be enhanced, while producing sufficient power to charge the vehicle battery and drive the electrical loads of the vehicle.

To achieve the above objectives, according to a first aspect of the invention, the control apparatus comprises voltage control means for setting a target value of voltage and current control means for setting a target value of current, and control mode changeover means for selecting either a voltage control mode of controlling the generator, in which the voltage control means maintains the generator output voltage at the target value of voltage, or a current control mode in which the current control means maintains the output current of the electric generator at the target current value.

Changeover between the voltage control mode and a current control mode is performed in accordance with some specific criteria, whereby becomes possible for example to achieve improved efficiency of operation of the electric generator, and thereby achieve a reduction of fuel consumption for the vehicle, while ensuring that the generated power level and output voltage level of the electric generator are sufficient to satisfy requirements for driving the electrical load that is imposed on the generator by equipment of the vehicle, and for supplying a charging current to the vehicle battery.

That is to say, it becomes possible to set a target value of generator output current that is the minimum value necessary for driving the electrical load of the vehicle under any specific operating condition, e.g., during engine idling. High efficiency of operation of the electric generator, with a corresponding improvement in fuel economy of the vehicle, can be achieved while suppressing occurrence of the above-described fluctuations in engine speed during idling which can occur with conventional types of electric generator control apparatus. The aforementioned unpleasant sensations during engine idling can thereby be prevented from being imparted to the vehicle driver.

In addition, it becomes possible to switch to the voltage control mode during deceleration of the vehicle, with the target value of output voltage of the electric generator being set at the maximum of an allowable range of values during the deceleration. In that way, since an increased level of charging current will be supplied to the battery during deceleration of the vehicle, the energy of motion of the vehicle can be efficiently recycled, i.e., can be converted to electrical energy that becomes stored in the battery.

Alternatively, the control apparatus can be configured such that the mode changeover means performs changeover between the voltage control mode and the current control mode in accordance with the level of charge of the battery.

This enables the discharge current supplied by the battery to be reduced when appropriate, thereby helping to prevent deterioration of the battery. Similarly, the voltage control mode can be established when the battery voltage falls below a predetermined range of values, to thereby maintain the output voltage of the electric generator at a target value that is sufficiently high to effect rapid recharging of the battery. Thus the battery voltage can be restored to a suitable level as quickly as possible.

Alternatively, the control apparatus can be configured such that the mode changeover means performs changeover between the voltage control mode and the current control mode in accordance with an ambient environmental condition, such as the external air temperature.

For example, when the ambient air temperature (e.g., as indicated by the temperature of the engine coolant when the engine is cold, with such temperature information being available from a coolant temperature sensor) is judged to be so low as to have an adverse effect upon engine starting, the voltage control mode can be established, with the target value of generator output voltage being set to a relatively high level, to thereby ensure that the vehicle battery will have sufficient stored energy to ensure reliability of engine starting, when engine starting is next performed.

From another aspect of the invention, the electric generator control apparatus can be adapted to receive failure diagnosis data from a failure diagnosis system, and can be configured such that the mode changeover means performs changeover between the voltage control mode and the current control mode in accordance with the diagnosis results. Thus for example, when abnormal operation of a generator output current sensor occurs, changeover can be performed to the voltage control mode as the only generator control mode. Control of the electric generator can thereby be continued, irrespective of the sensor failure.

From another aspect of the invention, the electric generator can be provided with autonomous control means for autonomously controlling the generator output voltage to a fixed value. In that case, when failure diagnosis data are available from a failure diagnosis system, the mode changeover means can select either the voltage control mode, the current control mode, or an autonomous control mode in which the autonomous control of the electric generator means autonomously controls the generator output voltage, with the autonomous control mode being selected when the failure diagnosis results indicate a serious failure of the electric generator control system.

It can thus be ensured that when control of the electric generator cannot be applied through either the current control mode or the voltage control mode due to a serious failure of the electric generator control system, at least the minimum level of generator output power necessary for operating the vehicle will continue to be produced, at an appropriate voltage level.

From another aspect of the invention, the electric generator control apparatus can be adapted to communicate with a control apparatus of the internal combustion engine (e.g., engine ECU), and to be capable of detecting a condition in which the required level of output power from the generator exceeds the maximum level of output current that can be produced with the operating status of the engine at that time.

When that condition is detected, the electric generator control apparatus responds by transmitting to the engine control apparatus a command for producing a change in the operating status of the engine that will effect an increase in the maximum level of output current that can be generated, e.g., an increase in the engine speed of rotation by a predetermined percentage or amount.

In that way, irrespective of whether the voltage control mode or the current control mode is established as the generator control mode, it can be ensured that the required level of output can be supplied by the electric generator.

DESCRIPTION OF PREFERRED EMBODIMENTS

Figure 1:
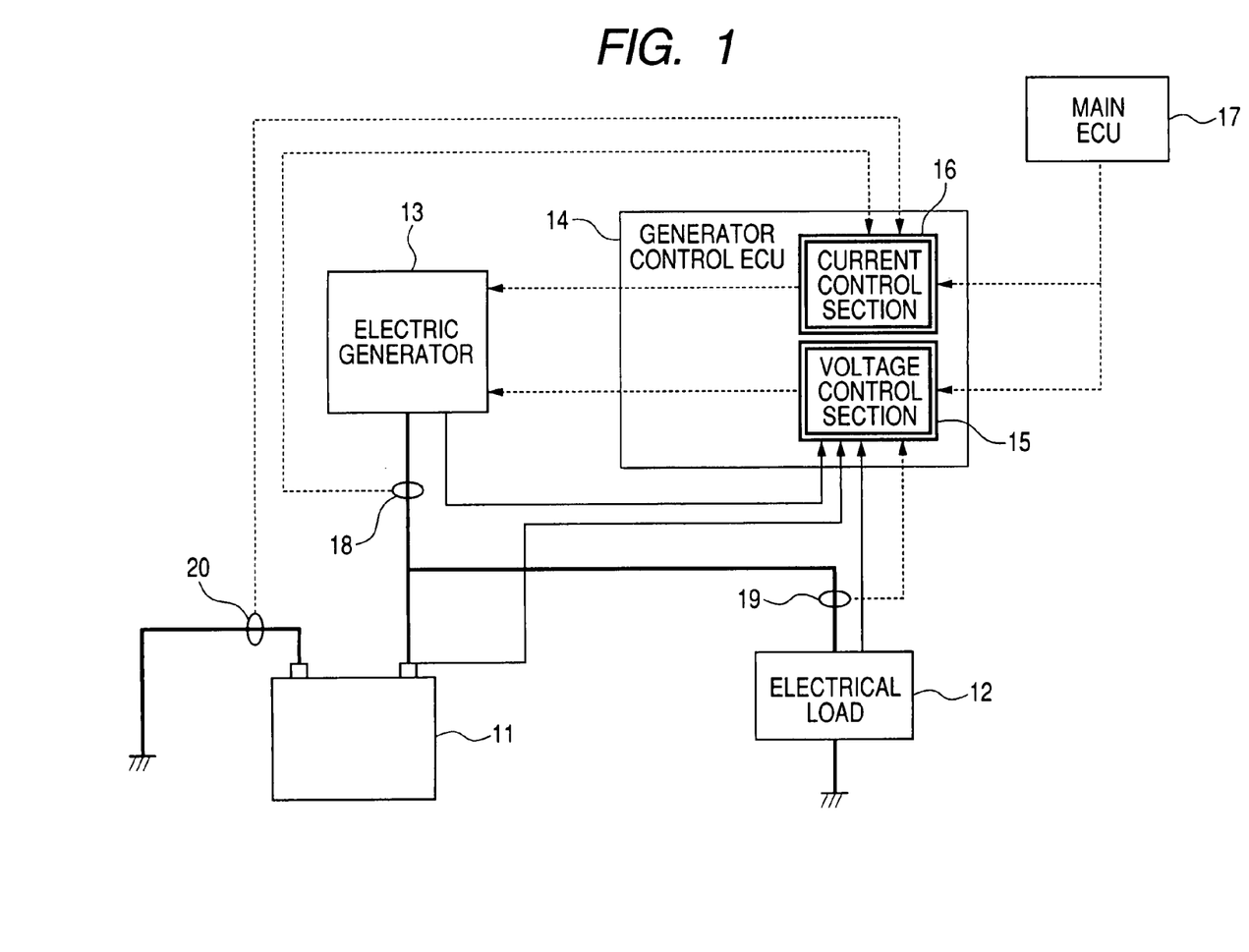
FIG. 1 is a block diagram showing the general configuration of a first embodiment of an electric generator control system.

FIG. 1 shows the overall configuration of an embodiment of a control system for an electric generator of a vehicle. The vehicle is provided with a battery 11, an electrical load 12 (e.g., consisting of lamps, etc.), and an electric generator 13 which is driven by the vehicle engine (i.e., internal combustion engine, not shown in the drawings). Electrical power that is generated by the electric generator 13 is supplied to the electrical load 12, and also supplied to charge the battery 11, to maintain the battery voltage within an appropriate range.

The generator control ECU 14 controls the level of generated output power of the electric generator 13 by controlling the field current of the generator. With this embodiment, the control of the generator output is based on a voltage control function (conceptually indicated as a voltage control section 15 in FIG. 7) which controls the output voltage of the electric generator 13 and a current control function (conceptually indicated as a current control section 16 in FIG. 7) which controls the level of output current that is supplied by the electric generator 13, with the voltage control function and current control function being each implemented by processing that is executed by the generator control ECU 14 as described hereinafter.

As is well known in this area of technology, the electric generator 13 incorporates a field current control circuit (not shown in the drawings) for controlling the generator output voltage by performing repetitive on/off switching of the field current of the generator with a variable duty ratio. With this embodiment, the duty ratio is set as a command value which is derived by the generator control ECU 14 and supplied to the electric generator 12.

The command value of duty ratio is successively adjusted in accordance with a deviation of the actual output voltage of the electric generator 13 from a target output voltage or in accordance with a deviation of the actual (measured) output current of the electric generator 13 from a target output current value, with the target values of voltage and current being derived by the generator control ECU 14.

Based on detected values of generator output voltage and output current, battery current, battery voltage, load current requirements, and information (including the engine speed of rotation, etc.) and control signals that are supplied from a main ECU (electronic control unit) 17 which supervises the overall operation of the vehicle engine, the generator control ECU 14 implements a mode changeover function for changeover between a voltage control mode in which the output voltage of the electric generator 13 is controlled to attain the aforementioned target voltage value (derived by the voltage control section 15) and a current control mode in which the output current of the electric generator 13 is controlled to attain the aforementioned target value of output current (derived by the current control section 16).

The control system further includes a current sensor 18 which detects the level of output current being supplied from the output terminal 18 of the electric generator 13, a current sensor 19 which detects the level of current flowing in the electrical load 12, and a current sensor 20 which detects the level of charge current that is flowing into the battery 11. The current sensor 20 is located in the current path between the negative terminal of the battery 11 and the vehicle ground potential (i.e., chassis potential). The detection signals produced by the current sensors 18 and 20 are inputted to the generator control ECU 14. In addition, the output voltage appearing at the positive terminal of the battery 11, the output voltage of the electric generator 13, and the actual supply voltage being applied to the electrical load 12, are also each inputted to the generator control ECU 14.

FIG. 7 is an example of an generator efficiency map diagram, in which the output current of the electric generator 13 and the engine rotation speed are parameters.

Figure 2:
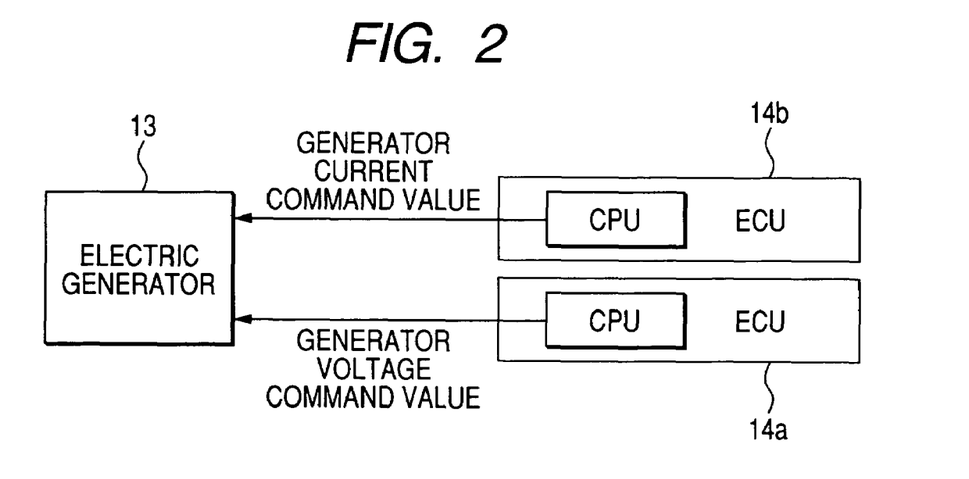
FIG. 2 is a block diagram illustrating an example of configuring a generator control ECU (electronic control unit) of the first embodiment as a combination of two ECUs.

The generator control ECU 14 may be configured as a single ECU, having a single CPU (central processing unit) as its main control circuit, or as shown in FIG. 2, can be configured of two separate ECUs, i.e., ECU 14*a*, ECU 14*b*. In the latter case, the ECU 14*a* performs the function of the voltage control section 15 of FIG. 1, to designate a target value of output voltage from the electric generator 13, while the ECU 14*b* performs the function of the current control section 16, to designate a target value of output current from the electric generator 13. This has the advantage that if one of the ECUs 14*a*, 14*b* should fail, control of the electric generator 13 can be continued based on the other ECU, i.e., a fail-safe effect is provided.

Figure 3:
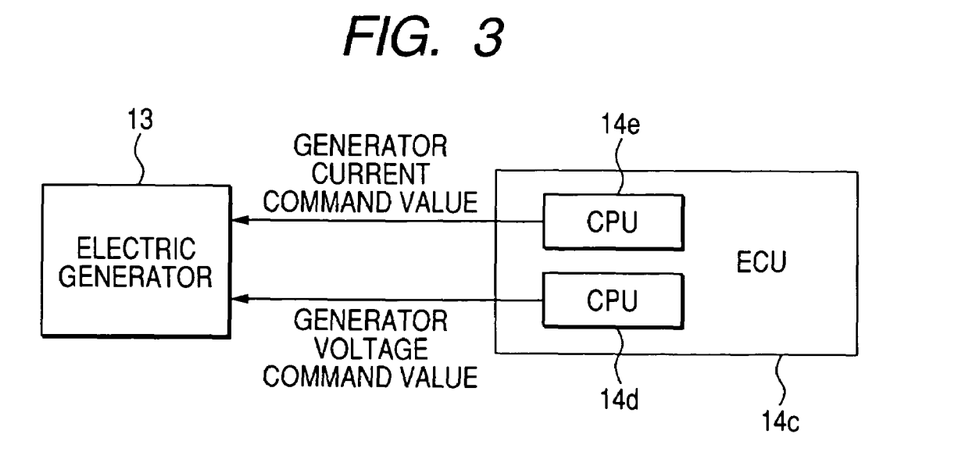
FIG. 3 is a block diagram illustrating an example of configuring the generator control ECU of the first embodiment to have a combination of two CPUs.

Alternatively as shown in FIG. 3, a single ECU 14*c* can be utilized, which incorporates two separate CPUs 14*d*, 14*e*. In that case, the CPU 14*d* performs the function of the voltage control section 15 of FIG. 1, to designate a target value of output voltage from the electric generator 13, while the CPU 14*e* performs the function of the current control section 16, to designate a target value of output current from the electric generator 13. This arrangement also provides a fail-safe capability, while having the advantage that the CPUs 14*d*, 14*e* can utilize the same peripheral circuits in common, so that manufacturing costs can be reduced, by comparison with utilizing separate ECUs as in FIG. 2.

Figure 4:
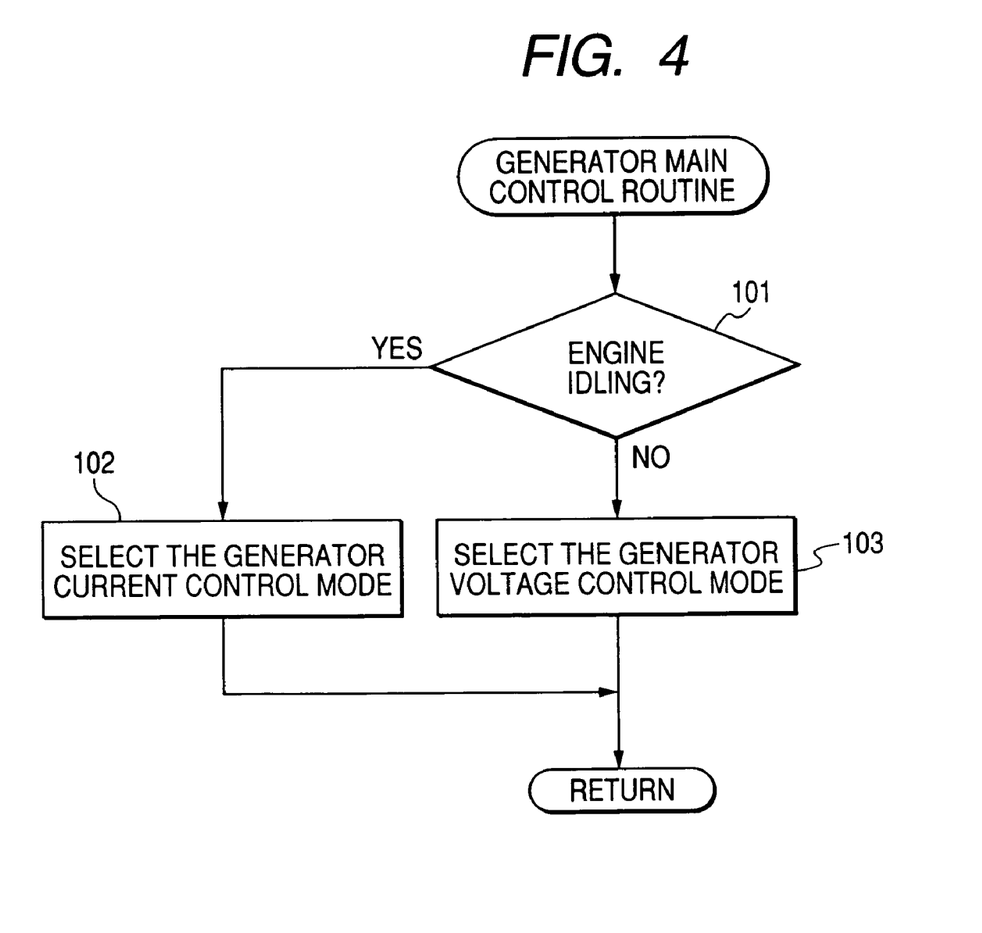
FIG. 4 is a flow diagram of a generator main control routine that is executed by the generator control ECU of the first embodiment.

The generator control ECU 14 repetitively executes processing of the generator main control routine shown in FIG. 4 to perform the mode changeover function, i.e., to select either operation in the aforementioned current control mode in which the output current of the electric generator 13 is held at a target value that is specified by the current control section 16, or operation in the voltage control mode in which the output voltage of the electric generator 13 is held at a target value that is specified by the voltage control section 15. With this embodiment, the mode selection is performed in accordance with whether or not the vehicle engine is currently in the idling condition.

Specifically, the generator main control routine is executed at fixed periodic intervals so long as the engine is running. When the routine is started, then firstly in step 101 a decision is made as to whether the engine is in the idling condition. This decision is made based on signals supplied from the main ECU 17. If the engine is in the idling condition then operation proceeds to step 102, in which control of the electric generator 13 is changed to the current control mode and the current control routine of FIG. 5 (described hereinafter) is executed. If the engine is not found to be in the idling condition then operation proceeds to step 103, in which control of the electric generator 13 is changed to the voltage control mode and the voltage control routine of FIG. 6 (described hereinafter) is executed.

Figure 5:
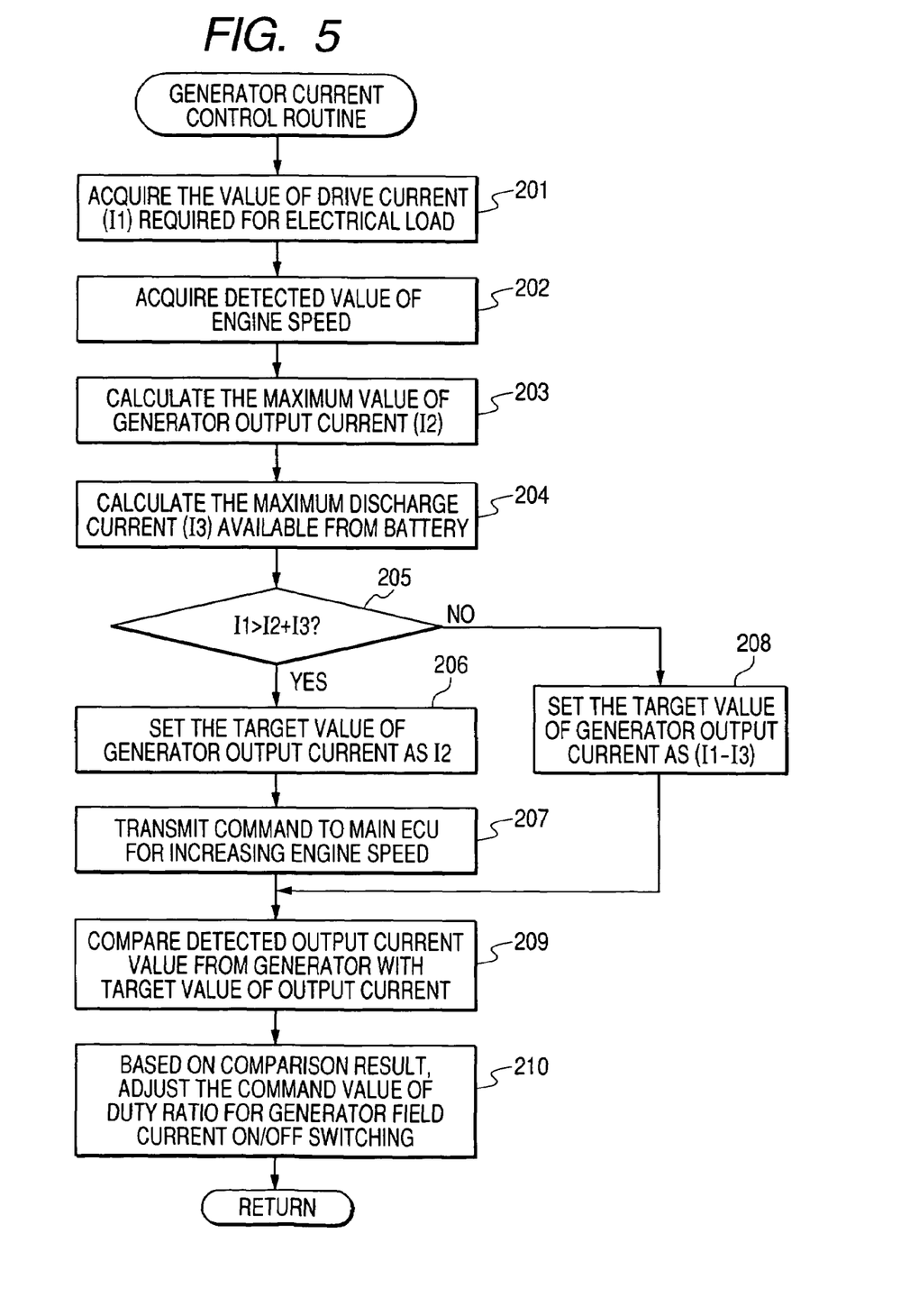
FIG. 5 is a flow diagram of a current control routine that is executed by the generator control ECU of the first embodiment.

If the voltage control routine of FIG. 5 is entered, as a result of executing step 102 above, then firstly in step 201 the demand value I1 of current required to drive the electrical load 12 is acquired, then in step 202 the rotation speed of the engine at that point is acquired, from data supplied by the main ECU 17. Operation then proceeds to step 203, to acquire the maximum level of current I2 that can be produced by the electric generator 13 under the operating condition (in particular, engine speed of rotation) of the engine at that time. This maximum level of current can for example be derived by calculation, or read out from a stored table of relationships between values of engine speed of rotation and maximum levels of generator output current.

Operation then proceeds to step 204, to calculate the maximum value of current I3 that can be supplied as discharge current from the battery 11, with the calculation being based on the state of charge of the battery 11 at that time. Next, in step 205, a decision is made as to whether the load demand value of current I1 is higher than the maximum total amount of current (I2+I3) that can be supplied by the battery 11 and the electric generator 13 at that time point, i.e., the maximum total level of current that can be supplied to the electrical load 12 under the operating condition of the engine at that time.

If the demand value of current I1 is higher than the maximum total amount of current (I2+I3), then it is judged that the maximum level of generator output is insufficient in relation to the load demand value I1. If that is found to be the case, then operation proceeds to step 206, in which the target value of current to be produced by the electric generator 13 is updated to become the aforementioned value I2 (i.e., the maximum current that can be generated by the electric generator 13 under the present operating condition of the engine).

Operation then proceeds to step 207, in which the engine operating condition is altered appropriately, i.e., by increasing the engine speed of rotation by a fixed percentage such as 1%, or by a fixed amount such as 0.1 V, to increase the maximum current I2 that can be generated by the electric generator 13.

However if it is found in step 205 that the required value of load current I1 is lower than the total current value (I2+I3), then it is judged that it is possible for the electric generator 13 to generate sufficient current to meet the demand, under the engine operating condition at that time. In that case, operation proceeds to step 208, in which the target value of output current to be produced by the electric generator 13 is updated to the value (I1−I3), i.e., the difference between the load demand current and the maximum level of discharge current available from the battery 11.

Following step 207 or step 208, in step 209, the level of output current from the electric generator 14 (detected by the sensor 18) is compared with the updated target value of current that has been set in step 206 or 208. A command value of the aforementioned duty ratio of on/off switching of the generator field current is then increased or decreased by a fixed amount, in accordance with the difference between the measured output current value and target value of generator output current, and the resultant updated command value is supplied to the electric generator 14, which executes on/off switching of the field current in accordance with that command value. Specifically, the duty ratio is increased if the measured output current is below the target value, and is decreased if the output current is equal to or greater than the target value.

In that way, by successive executions of the routine of FIG. 5, an appropriate target value of current is established during engine idling, and the electric generator 14 is controlled to produce that target output current value.

As a result, only the minimum necessary level of generator output current is produced by the electric generator 13.

Figure 6:
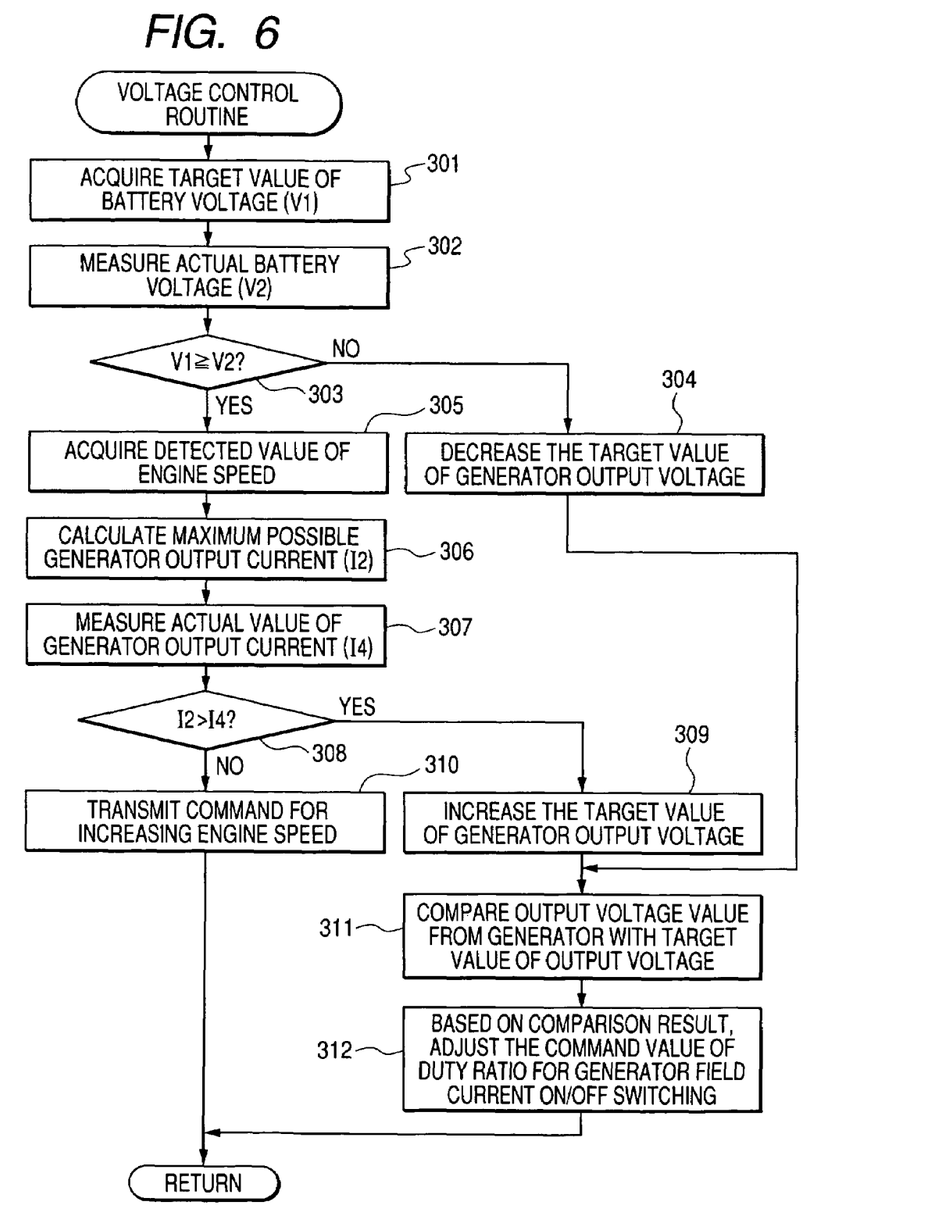
FIG. 6 is a flow diagram of a voltage control routine that is executed by the generator control ECU of the first embodiment.

If the voltage control routine of FIG. 6 is initiated as a result of executing step 103 of the generator control routine of FIG. 4, then firstly in step 301 a target value of battery voltage V1 is acquired, e.g., as a value stored beforehand in memory. Next in step 302 the actual battery output voltage V2 is measured, then in step 303 the target value of voltage V1 and the actual battery voltage V2 are compared. If V2 is found to be higher than V1 then operation proceeds to step 304 in which the target value of output voltage to be produced from the electric generator 13 is reduced by a fixed amount or fixed proportion. However if it is found in step 303 that V1 is equal to or greater than V2 then operation proceeds to step 305, in which the engine rotation speed at that time is obtained, from data transmitted from the main ECU 17. Step 306 is then executed, to obtain the maximum level of current I2 that can be generated by the electric generator 13 under the engine operating condition at that time.

Operation then proceeds to step 307, in which the output current I4 being produced from the electric generator 13 at that time is measured, then in step 308 the maximum output value of generator current I2 is compared with the measured generated current value I4. If I4 is less than I2, then it is judged that it is possible to increase the generating efficiency of the electric generator 13 by increasing the generated output current, and so operation proceeds to step 309 in which the target value of output voltage from the electric generator 13 is increased by a fixed amount or proportion, to obtain an updated target value that will increase the electric power generating efficiency.

Following step 309, in step 311, the level of output voltage from the electric generator 14 is compared with the updated target value of output voltage that has been set in step 309. The command value of the duty ratio of on/off switching of the generator field current is then increased or decreased by a fixed amount, in accordance with the difference between the actual generated output voltage and the updated target value of generator output voltage, and the resultant updated command value is supplied to the electric generator 14, which executes on/off switching of the field current in accordance with that command value. Specifically, the duty ratio is increased if the actual generated output voltage is below the target value, and is decreased if the actual generated output voltage is equal to or greater than the target value.

In that way, by successive executions of the routine of FIG. 6, an appropriate target value of output voltage of the electric generator 13, ensuring a high efficiency of electrical generation, is established during normal running of the vehicle (i.e., when the engine speed of rotation is above idling speed) and the electric generator 14 is controlled to produce that target output voltage.

Specifically (so long as a charging current is being supplied to the battery 11) in order to maximize efficiency, the electric generator 13 is controlled to continuously operate in a condition in which the generated output current is close to the maximum level that can be generated under the current operating condition (i.e., speed of rotation) of the engine.

Furthermore as described previously, if the output voltage of the electric generator 13 were to be increased during engine idling in order to maintain a fixed level of voltage, by operation in the voltage control mode, then the electric power generating efficiency of the electric generator 13 would be reduced and the level of torque required to drive the electric generator 13 could increase. This can result in variations in the engine speed of rotation, thereby producing an unpleasant sensation in the vehicle driver.

However with the first embodiment described above, during engine idling, control of the electric generator 13 is changed to the current control mode in which it is ensured as far as possible that the electric generator 13 produces only the minimum level of current necessary to drive the electrical load 12. It is found that as a result, in addition to increasing the electric power generating efficiency, variations in the engine speed (due to variations in the level of torque required to drive the electric generator 13) during idling can be suppressed. Hence the aforementioned unpleasant sensation for the vehicle driver can be prevented.

Second Embodiment

A second embodiment of a control apparatus for an electric generator of a vehicle will be described referring to the flow diagram of FIG. 8. This embodiment differs from the first embodiment in that the electric generator 13 is provided with an autonomous control function whereby the output voltage of the electric generator 13 is held at a fixed level by autonomous operation. Specifically, with autonomous control, the output voltage of the electric generator 13 is compared internally with a fixed reference value, and the aforementioned duty ratio of controlling the generator field current is varied in accordance with the comparison result.

The autonomous control function can be selected for use in place of the above-described voltage control mode or current control mode, as described in the following. In addition, the second embodiment incorporates a failure diagnosis system (not shown in the drawings) for detecting any interruption of communication between the electric generator 13 and the current control section 16, and for detecting abnormal operation of the generator control ECU 14.

In other respects, the configuration of the second embodiment is identical to that of the first embodiment described above referring to FIG. 1.

Figure 8:
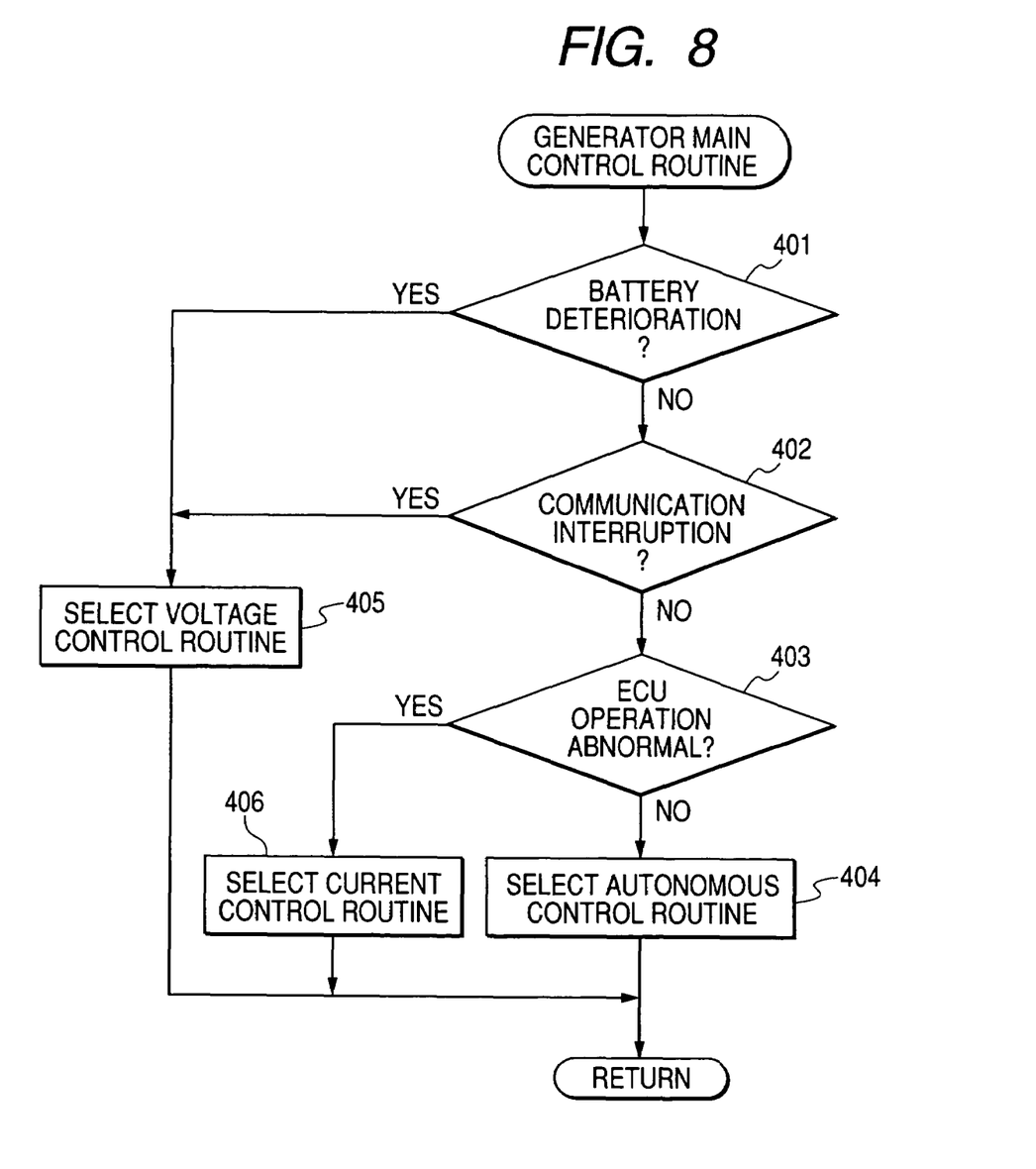
FIG. 8 is a flow diagram of a generator main control routine that is executed by the generator control ECU of a second embodiment.

With the second embodiment, the generator main control routine shown in the flow diagram of FIG. 8 is periodically executed at fixed intervals by the generator control ECU 14 while the vehicle engine is running, for performing changeover between the current control mode, voltage control mode (respectively as described for the first embodiment) and an autonomous control mode in which the electric generator 13 applies the aforementioned autonomous control function. Changeover between the current control mode, voltage control mode and autonomous control mode is performed in accordance with diagnostics results obtained by the failure diagnosis system.

In the processing of FIG. 8, firstly in step 401 a decision is made as to whether the battery 11 has become deteriorated beyond a predetermined extent (e.g., as indicated by an excessively low level of battery voltage). If it is judged that that he battery 11 is excessively deteriorated, then operation proceeds to step 405, in which the voltage control routine of FIG. 6 described above is executed and the control mode of the electric generator 13 is switched to the voltage control mode.

However if it is judged in step 401 that the battery 11 is not excessively deteriorated, then operation proceeds to 402 in which a decision is made as to whether an interruption of communication between the current control section 16 and the electric generator 13 has occurred. If it is judged that a communication interruption has occurred, then operation proceeds to step 405, in which the voltage control routine of FIG. 6 is executed and the control mode of the electric generator 13 is switched to the voltage control mode. As a result, the output voltage of the electric generator 13 is controlled to a specific target value that is derived by the processing of FIG. 6, as described above for the first embodiment.

However if it is judged in step 402 that there is no interruption of communication between the electric generator 13 and the current control section 16, then operation proceeds to step 403 in which a decision is made as to whether abnormality of operation of the generator control ECU 14 is occurring. If such abnormal operation is occurring, operation proceeds to step 406 in which the control mode of the electric generator 13 is switched to the autonomous control mode described above, so that the output voltage of the electric generator 13 is autonomously controlled to attain a fixed value.

If it is judged in step 403 that there is no abnormality of operation of the generator control ECU 14, then operation proceeds to step 404, in which the current control routine of FIG. 5 is executed, and the control mode of the electric generator 13 is set to the current control mode. The output current of the electric generator 13 is thereby controlled to a specific target value, as described for the first embodiment.

It can thus be understood that with the second embodiment, by performing changeover of the control mode of the electric generator 13 between the voltage control mode, the current control mode and the autonomous control mode, with the mode changeover being performed in accordance with the results produced by a failure diagnosis system, it can be ensured that the generated output power of the electric generator 13 is effectively controlled, irrespective of whether the battery 11 is in a condition whereby its output voltage is tending to become excessively low, or a communication interruption occurs between the electric generator 13 and the current control section 16, or abnormal operation of the generator control ECU 14 occurs.

It should be noted that the invention is not limited to the above embodiments, and that various alternative embodiments can be envisaged as described in the following.

Alternative Embodiment 1

It would be equally possible for the control mode of the electric generator 13 to be switched between only the voltage control mode and the current control mode, in accordance with the results produced by a failure diagnosis system. For example an embodiment could be configured whereby, if it is detected that there is abnormal operation of a sensor that detects the output current level of the electric generator 13, changeover to the voltage control mode would be performed. In that way, effective control of the generated output of the electric generator 13 could be maintained irrespective of the sensor failure.

Alternative Embodiment 2

It would be equally possible to configure an embodiment which performs changeover between the voltage control mode and the current control mode in accordance with the running condition of the vehicle. For example, the embodiment can be configured such that when the vehicle is decelerating, the control mode of the electric generator 13 is switched to the voltage control mode, established such that the output voltage of the electric generator 13 is held at the upper limit of a specific range of values. In that way it becomes possible to convert the energy of motion of the vehicle, as the vehicle decelerates, into electrical energy that becomes stored in the battery 11, so that energy recovery is achieved.

Specifically, with this embodiment, the generator main control routine of FIG. 4 for the first embodiment would be modified by further including a judgement step for judging whether the vehicle is decelerating (as indicated by data transmitted from the main ECU 17). If the vehicle is found to be decelerating, then the voltage control mode would be selected, with a specific target value of battery voltage V1 being designated in step 301 of the voltage control routine of FIG. 5, i.e., a target value that is suitably high.

Alternative Embodiment 3

It would be equally possible to configure an embodiment which performs changeover between the voltage control mode and the current control mode in accordance with the degree of discharge of the battery 11. For example, such an embodiment can be configured to assign priority to restoring the battery voltage to an appropriate level, by effecting changeover to the voltage control mode if it is detected that the battery voltage is below the lower limit of an appropriate range of voltage values. In that way, the charge voltage of the battery can be restored to a suitable level as quickly as possible.

Alternative Embodiment 4

It would be equally possible to configure an embodiment which performs changeover between the voltage control mode and the current control mode in accordance with one or more specific environmental conditions of the vehicle. For example, such an embodiment can be supplied with information that indicates the outside air temperature, when engine starting is performed. This information can simply be the engine coolant temperature, (i.e., information that is provided from a sensor to the main ECU 17, and hence is available to the generator control ECU 14). With this embodiment, when it is judged that the external air temperature is below a predetermined threshold level (specifically, corresponding to a temperature value below which engine starting becomes difficult), then the electric generator control apparatus establishes the voltage control mode, with the target output voltage of the electric generator 13 being maintained at a high value (i.e., by applying a suitably high value of target battery voltage V1 in step 301 of FIG. 5).

In that way it can be ensured that the battery 11 will be maintained at a high level of charge, so that on the next occasion when the engine is to be started (i.e., from a cold engine condition), sufficient energy will be available from the battery to ensure that engine starting can be reliably achieved.

It should further be noted that it may be advantageous to combine respective features of the various embodiments described above. For example, it would be possible to configure the control system to function as described for the first embodiment, so long as the external air temperature is judged to be sufficiently high, and to apply the voltage control mode with an appropriately high target value of generator output voltage, as described for the fourth embodiment, if the temperature is found to be below the aforementioned threshold value.

Thus, various modifications and combinations of the above embodiments could be envisaged, which fall within the scope claimed for the invention as set out in the appended claims.

What is claimed is:

1. An electric generator control apparatus, for controlling an electric generator that is driven by an internal combustion engine and that supplies a charging current to a battery, wherein said electric generator control apparatus comprises:
   voltage control means for setting a target voltage value and for controlling an output voltage of said electric generator to maintain said target voltage value;
   current control means for setting a target current value and for controlling an output current of said electric generator to maintain said target current value; and
   control mode changeover means for selectively establishing a voltage control mode in which said output voltage of said electric generator is controlled by said voltage control means to maintain said target voltage value and a current control mode in which said output current of said electric generator is controlled by said current control means to maintain said target current value,
   wherein said control mode changeover means performs said changeover between said voltage control mode and said current control mode in accordance with whether or not deterioration of said battery exceeds a predetermined extent.

2. An electric generator control apparatus, for controlling an electric generator that is driven by an internal combustion engine and that supplies a charging current to a battery, wherein said electric generator control apparatus comprises:
   voltage control means for setting a target voltage value and for controlling an output voltage of said electric generator to maintain said target voltage value;
   current control means for setting a target current value and for controlling an output current of said electric generator to maintain said target current value; and
   control mode changeover means for selectively establishing a voltage control mode in which said output voltage of said electric generator is controlled by said voltage control means to maintain said target voltage value and a current control mode in which said output current of said electric generator is controlled by said current control means to maintain said target current value, wherein
   said control mode changeover means performs said changeover between said voltage control mode and said current control mode in accordance with an ambient environmental condition,
   said ambient environmental condition is an external air temperature,
   said electric generator control apparatus is coupled to temperature sensor means, for receiving data indicative of said external air temperature, and comprises means for judging said external air temperature, and
   when said external air temperature is judged to be below a predetermined threshold value, said control mode changeover means establishes said voltage control mode, and said voltage control means sets said target voltage at a value that has been predetermined as corresponding to a condition of the external air temperature being below said threshold value.

3. An electric generator control apparatus, for controlling an electric generator that is driven by an internal combustion engine and that supplies a charging current to a battery, wherein said electric generator control apparatus comprises:
   voltage control means for setting a target voltage value and for controlling an output voltage of said electric generator to maintain said target voltage value;
   current control means for setting a target current value and for controlling an output current of said electric generator to maintain said target current value; and
   control mode changeover means for selectively establishing a voltage control mode in which said output voltage of said electric generator is controlled by said voltage control means to maintain said target voltage value and a current control mode in which said output current of said electric generator is controlled by said current control means to maintain said target current value,
   wherein said electric generator control apparatus is coupled to receive data indicative of diagnosis results obtained by a failure diagnosis system, and wherein said control mode changeover means performs said changeover between said voltage control mode and said current control mode in accordance with said diagnosis results.

4. An electric generator control apparatus, for controlling an electric generator that is driven by an internal combustion engine and that supplies a charging current to a battery, wherein said electric generator control apparatus comprises:
   voltage control means for setting a target voltage value and for controlling an output voltage of said electric generator to maintain said target voltage value;
   current control means for setting a target current value and for controlling an output current of said electric generator to maintain said target current value; and
   control mode changeover means for selectively establishing a voltage control mode in which said output voltage of said electric generator is controlled by said voltage control means to maintain said target voltage value and a current control mode in which said output current of said electric generator is controlled by said current control means to maintain said target current value, wherein
   said electric generator control apparatus is coupled to receive data indicative of diagnosis results obtained by a failure diagnosis system,
   said electric generator comprises autonomous control means operable for autonomously controlling said output voltage of said electric generator to a predetermined fixed value, and
   in response to predetermined diagnosis results being obtained by said failure diagnosis system, said control mode changeover means establishes an autonomous control mode in which said autonomous control means autonomously controls said output voltage of said electric generator.

5. An electric generator control apparatus, for controlling an electric generator that is driven by an internal combustion engine and that supplies a charging current to a battery, wherein said electric generator control apparatus comprises:

voltage control means for setting a target voltage value and for controlling an output voltage of said electric generator to maintain said target voltage value;

current control means for setting a target current value and for controlling an output current of said electric generator to maintain said target current value; and control mode changeover means for selectively establishing a voltage control mode in which said output voltage of said electric generator is controlled by said voltage control means to maintain said target voltage value and a current control mode in which said output current of said electric generator is controlled by said current control means to maintain said target current value, wherein said electric generator control apparatus is coupled for communication with a control apparatus of said internal combustion engine, and wherein said electric generator control apparatus is adapted to:

detect a condition whereby a maximum level of output electrical power that can be produced by said electric generator under a current operating status of said internal combustion engine does not attain a required level of electrical power, and when said condition is detected, transmit to said control apparatus of said internal combustion engine a command for producing a change in said operating status of said internal combustion engine.

* * * * *